United States Patent [19]

Leslie et al.

[11] Patent Number: 4,882,402

[45] Date of Patent: Nov. 21, 1989

[54] SIDE CHAIN LIQUID CRYSTALLINE POLYMERIC MEDIA EXHIBITING THIRD ORDER NONLINEAR OPTICAL RESPONSE

[75] Inventors: Thomas M. Leslie, Clinton Township, Hunterdon County; Hyun N. Yoon, New Providence; Ronald N. DeMartino, Wayne; James B. Stamatoff, Westfield, all of N.J.

[73] Assignee: Hoechst Celanese Corporation, Somerville, N.J.

[21] Appl. No.: 108,686

[22] Filed: Oct. 15, 1987

Related U.S. Application Data

[62] Division of Ser. No. 915,180, Oct. 3, 1986.

[51] Int. Cl.$^4$ .................. C08F 20/38; C08F 20/34; C08F 20/24
[52] U.S. Cl. .................. 526/243; 252/589; 252/582; 252/299.01; 252/299.6; 252/299.66; 526/245; 526/246; 526/288; 526/298; 526/310; 526/311; 526/312
[58] Field of Search .............. 526/243, 246, 245, 288, 526/298, 310, 311, 312

[56] References Cited

U.S. PATENT DOCUMENTS 4,631,328 12/1986 Ringsdorf .................. 526/259

Primary Examiner—Christopher Henderson
Attorney, Agent, or Firm—DePaoli & O'Brien

[57] ABSTRACT

This invention provides a process for producing a transparent optical medium consisting of a liquid crystalline polymer which exhibits third order nonlinear optical response.

Illustrative of an invention optical medium is a transparent film of a side chain liquid crystalline polymer corresponding to the formula:

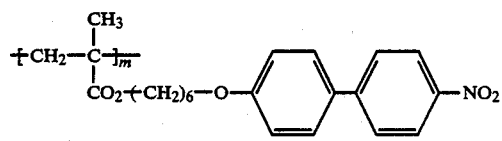

The transparent film has an isotropic molecular configuration with macroscopic centrosymmetry, and exhibits essentially no scattering of a transmitted incident light beam.

3 Claims, No Drawings

SIDE CHAIN LIQUID CRYSTALLINE POLYMERIC MEDIA EXHIBITING THIRD ORDER NONLINEAR OPTICAL RESPONSE

This invention was made with Government support under Contract Number F49620-84-C-0110 awarded by the Department of Defense. The Federal Government has certain rights in this invention.

This is a division of application Ser. No. 915,180 filed Oct. 3, 1986 now U.S. Pat. No. 4,762,912.

BACKGROUND OF THE INVENTION

It is known that organic and polymeric materials with large delocalized $\pi$-electron systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of the electronic interactions responsible for nonlinear optical effects.

Thin films of organic or polymeric materials with large second order nonlinearities in combination with electronic circuitry have potential as systems for laser modulation and deflection, information control in optical circuitry, and the like.

Other novel processes occurring through third order nonlinearity such as degenerate four-wave mixing, whereby real-time processing of optical fields occurs, have potential utility in such diverse fields as optical communications and integrated circuit fabrication.

Of particular importance for conjugated organic systems is the fact that the origin of the nonlinear effects is the polarization of the $\pi$-electron cloud as opposed to displacement or rearrangement of nuclear coordinates found in inorganic materials.

Nonlinear optical properties of organic and polymeric material was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 1983.

The above recited publications are incorporated herein by reference.

Of more specific interest with respect to the present invention embodiments is prior art relating to side chain liquid crystalline polymers, such as the five articles published on pages 275–368 of "Polymeric Liquid Crystals", edited by A. Blumstein (Plenum Publishing Corporation, New York, 1985).

U.S. Pat. No. 4,293,435 describes liquid crystalline polymers corresponding to the formula:

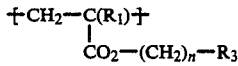

where $R_1$ is hydrogen or methyl, n is an integer from 1 to 6, and $R_3$ represents a structural element containing at least two phenylene groups.

Makromol, 179, 2541(1978) by H. Finkelmann et al. describes a model consideration for liquid crystalline polymers with biphenyl groups as mesogenic entities.

J. Polym. Sci., 19, 1427(1981) by Paleos et al. describes the synthesis of liquid crystalline polymers which are prepared by the interaction of poly(acryloyl chloride) with mesogenic compounds such as p-aminophenyl.

Eur. Polym. J., 18, 651(1982) describes comb-like liquid crystalline polymers of the smectic and nematic types with cyanobiphenyl groups in the side-chain:

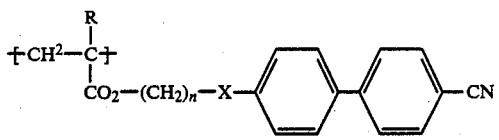

where R is hydrogen or methyl, n is an integer of 2–11, and X is an oxy, alkylene or carbonyloxy divalent radical.

Other publications which describe thermotropic liquid crystalline polymers with side chain induced crystallinity include Polymer, 25, 1342(1984); Eur. Polym. J., 21, No. 7, 645(1985); Polymer, 26, 615(1985); and references cited therein.

The above listed publications are incorporated herein by reference.

There is continuing interest in the theory and practice of liquid crystalline polymers which are characterized by a comb-like mesogenic side chain structures.

There is also an increasing research effort to develop new nonlinear optical organic systems for prospective novel phenomena and devices adapted for light switching and light modulation, information control in optical circuitry, and optical communications. The potential utility of organic materials with large second order and third order nonlinearities for very high frequency application contrasts with the bandwidth limitations of conventional inorganic electrooptic materials.

Accordingly, it is an object of this invention to provide novel transparent polymeric optical media which exhibit third order nonlinear optical response.

It is another object of this invention to provide a process for producing transparent nonlinear optical media which consist of a thermotropic liquid crystalline polymer having mesogenic side chains which exhibit third order nonlinear optical response.

It is a further object of this invention to provide light switch and light modulator devices with a transparent polymeric nonlinear optical component comprising a thermotropic side chain liquid crystalline polymer which exhibits third order nonlinear optical response.

Other objects and advantages of the present invention shall become apparent from the accompanying description and examples.

The present patent application has subject matter related to the disclosures of copending patent applications Ser. Nos. 822,092, now U.S. Pat. Nos. 4,694,066; 822,093; and 822,094, filed Jan. 24, 1986, respectively; patent application Ser. No. 898,982, filed Aug. 22, 1986, now U.S. Pat. No. 4,795,664; and patent application Ser. No. 915,179, filed Oct. 3, 1986.

DESCRIPTION OF THE INVENTION

One or more objects of the present invention are accomplished by the provision of a process for the production of a transparent nonlinear optical medium which comprises heating a thermotropic liquid crystalline polymer to form an isotropic melt phase, and cooling the isotropic melt phase rapidly to below the glass transition temperature of the polymer to form a transparent solid medium; wherein the polymer has mesogenic side chains which comprise at least about 25 weight percent of the polymer, and the polymer has a glass transition temperature above about 40° C., and wherein the transparent medium exhibits third order nonlinear optical response.

The main chain of the liquid crystalline polymer can have various structures such as polyvinyl, polysiloxane, polyoxyalkylene, polyester, polyamide, and the like. The main chain structure can be either a homopolymer or copolymer type.

The rapid cooling of the isotropic melt phase is accomplished within a time period between about 0.001-60 seconds.

A transparent nonlinear optical medium produced by the above process typically exhibits a third outer nonlinear optical susceptibility $\chi^{(3)}$ of at least about $1 \times 10^{-11}$ esu as measured at 1.91 μm excitation wavelength.

In another embodiment this invention provides a process for the production of a transparent nonlinear optical medium which comprises heating a thermotropic liquid crystalline polymer above the mesophase temperature range to form an isotropic melt phase, and cooling the isotropic melt phase rapidly to below the glass transition temperature of the polymer to form a transparent solid medium; wherein the transparent nonlinear optical medium exhibits a third order nonlinear optical susceptibility $X^{(3)}$ of at least about $1 \times 10^{-11}$ esu as measured at 1.91 μm excitation wavelength, and wherein the polymer is characterized by a recurring monomeric unit corresponding to the formula:

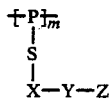

where P is a main chain polymer unit; m is an integer of at least 10; S is a flexible spacer group having a linear chain length of between about 1-25 atoms; X is —NR—, —O— or —S—; R is hydrogen or a $C_1$-$C_4$ alkyl group; Y is

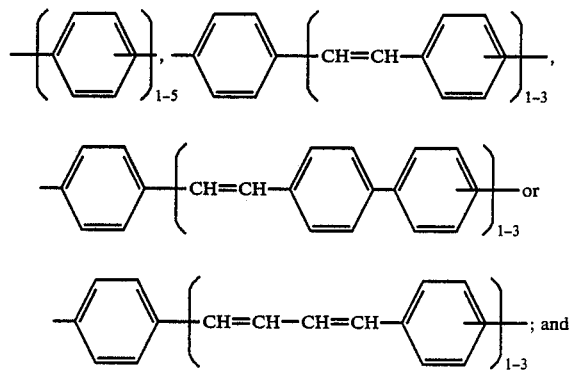

Z is an electron-donating group or an electron-withdrawing group; and where the polymer has a glass transition temperature above about 60° C.

Illustrative of $C_1$-$C_4$ alkyl groups are methyl, ethyl, propyl, isopropyl, butyl, isobutyl and 2-butyl.

The term "electron-donating" as employed herein refers to organic substituents which contribute electron density to the π-electron system when the conjugated electronic structure is polarized by the input of electromagnetic energy.

The term "electron-withdrawing" as employed herein refers to electronegative organic substituents which attract electron density from the π-electron system when the conjugated electron structure is polarized by the input of electromagnetic energy.

Illustrative of electron-donating Z groups are amino, alkyl, alkoxy, alkylthio, hydroxy, thiolo, acyloxy, vinyl, halo, and the like.

Illustrative of electron-withdrawing substituents as represented by Z in the above formula are nitro, haloalkyl, cyano, acyl, alkanoyloxy, alkoxysulfonyl, and the like.

The term "transparent" as employed herein refers to an optical medium which is transparent or light transmitting with respect to incident fundamental light frequencies and created light frequencies. In a nonlinear optical device, a present invention nonlinear optical medium component is transparent to both the incident and exit light frequencies.

The term "thermotropic polymer" as employed herein refers to a polymer which is liquid crystalline (i.e., anisotropic) in the melt phase.

The term "isotropic" as employed herein refers to a transparent medium of a liquid crystalline polymer in which the optical properties are equivalent in all tensor directions.

In another embodiment this invention provides a process for the production of a transparent nonlinear optical medium which comprises heating a thermotropic liquid crystalline polymer above the mesophase temperature range to form an isotropic melt phase, and cooling the isotropic melt phase rapidly to below the glass transition temperature of the polymer to form a transparent solid medium; wherein the transparent nonlinear optical medium exhibits a third order nonlinear optical susceptibility $\chi^{(3)}$ of at least about $1 \times 10^{-11}$ esu as measured at 1.92 μm excitation wavelength, and wherein the polymer is characterized by a recurring monomeric unit corresponding to the formula:

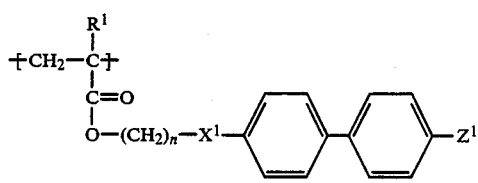

where n is an integer between about 4-20; $X^1$ is —$NR^1$—, —O—, or —S—; $R^1$ is hydrogen or methyl; $Z^1$ is —$NO_2$, —CN or —$CF_3$; and where the polymer has a weight average molecular weight in the range between about 5000-200,000, and a glass transition temperature above about 40° C.

In the above represented acrylic-type monomeric unit formula, the biphenyl structure also can be a corresponding stilbene structure.

In another embodiment this invention provides a transparent nonlinear optical medium comprising a liquid crystalline polymer which is characterized by a recurring monomeric unit corresponding to the formula:

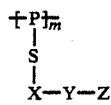

where P is a main chain polymer unit; m is an integer of at least 10; S is a flexible spacer group having a linear chain length of between about 1-25 atoms; X is —NR—, —O— or —S—; R is hydrogen or a $C_1$-$C_4$ alkyl group; Y is

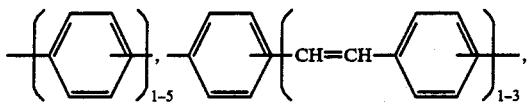

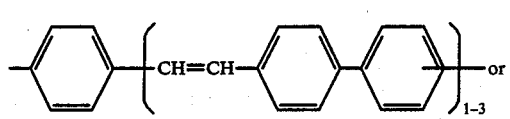

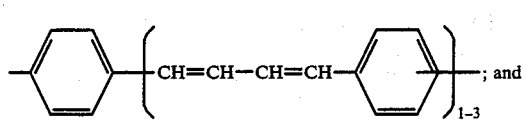

Z is an electron-donating group or an electron-withdrawing group; and where the polymer has a glass transition temperature above about 40° C.; wherein the transparent nonlinear optical medium exhibits a third order nonlinear optical susceptibility $\chi^{(3)}$ of at least about $1 \times 10^{-11}$ esu as measured at 1.91 μm excitation wavelength, and the optical medium has an isotropic molecular configuration with macroscopic centrosymmetry.

In another embodiment this invention provides a transparent nonlinear optical medium comprising a liquid crystalline polymer which is characterized by a recurring monomeric unit corresponding to the formula:

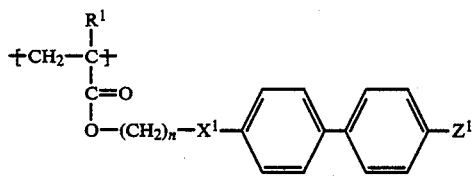

where n is an integer between about 4-20; $X^1$ is —$NR^1$—, —O—, or —S—; $R^1$ is hydrogen or methyl; $Z^1$ is —$NO_2$, —CN or —$CF_3$; and where the polymer has a weight average molecular weight in the range between about 5000-200,000, and a glass transition temperature above about 40° C.; wherein the transparent nonlinear optical medium exhibits a third order nonlinear optical susceptibility $\chi^{(3)}$ of at least about $1 \times 10^{-11}$ esu as measured at 1.91 μm excitation wavelength, and the optical medium has an isotropic molecular configuration with macroscopic centrosymmetry.

The nonlinear optical media of the present invention has exceptional optical clarity, i.e., the media typically exhibit less than about one percent scattering of transmitted incident light.

In another embodiment this invention provides an optical light switch or light modulator device with a polymeric nonlinear optical component comprising a transparent solid medium of a liquid crystalline polymer which is characterized by a recurring monomeric unit corresponding to the formula:

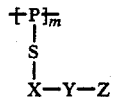

where P is a main chain polymer unit; m is an integer of at least 10; S is a flexible spacer group having a linear chain length of between about 1-25 atoms; X is —NR—, —O— or —S—; R is hydrogen or a $C_1$-$C_4$ alkyl group; Y is

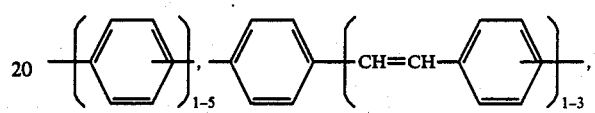

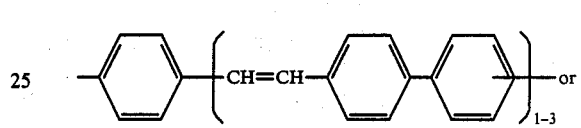

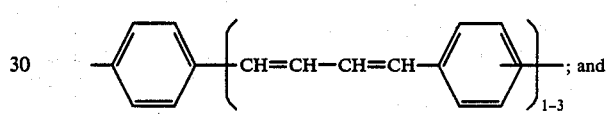

Z is an electron-donating group or an electron-withdrawing group; and where the polymer has a glass transition temperature above about 40° C.; wherein the transparent nonlinear optical medium exhibits a third order nonlinear optical susceptibility $\chi^{(3)}$ of at least about $1 \times 10^{-11}$ esu as measured at 1.91 μm excitation wavelength, and the optical medium has an isotropic molecular configuration with macroscopic centrosymmetry.

In another embodiment this invention provides an optical light switch or light modulator device with a polymeric nonlinear optical component comprising a transparent solid medium of a liquid crystalline polymer which is characterized by a recurring monomeric unit corresponding to the formula:

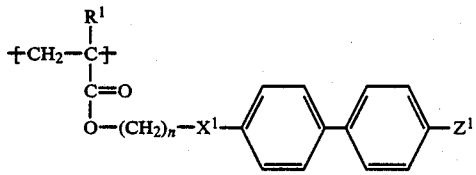

where n is an integer between about 4-20; $X^1$ is —$NR^1$—, —O—, or —S—; $R^1$ is hydrogen or methyl; $Z^1$ is —$NO_2$, —CN or —$CF_3$; and where the polymer has a weight average molecular weight in the range between about 5000-200,000, and a glass transition temperature above about 40° C.; wherein the transparent nonlinear optical medium exhibits a third order nonlinear optical susceptibility $\chi^{(3)}$ of at least about $1 \times 10^{-11}$ esu as measured at 1.91 μm excitation wavelength, and the optical medium has an isotropic molecular configuration with macroscopic centrosymmetry.

Synthesis of Liquid Crystalline Polymers

The preparation of a polyvinyl liquid crystalline polymer with mesogenic side chains is illustrated by the following flow diagram:

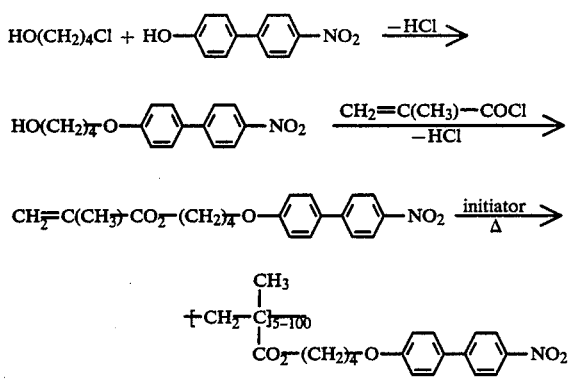

The preparation of a polysiloxane liquid crystalline polymer with mesogenic side chains is illustrated by the following flow diagram of a reaction between an organohydrogenpolysiloxane and a vinyl-substituted mesogenic compound:

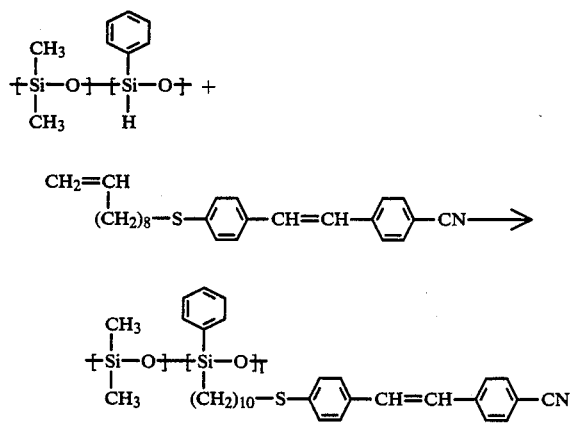

The average number of silicon atoms in the organopolysiloxane main chain can vary in the range between about 3–3000.

Polysiloxane liquid crystalline polymers with mesogenic side chains are described in U.S. Pat. Nos. 4,358,391; 4,388,453; and 4,410,570; and in publications such as Makromol. Chem., Rapid Commun. 3, 557(1982); and 5, 287(1984); incorporated herein by reference.

The preparation of a polyoxyalkylene liquid crystalline polymer with mesogenic side chains is illustrated by the following polymerization reaction:

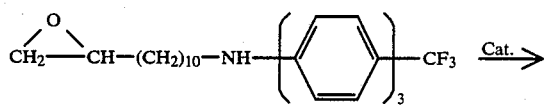

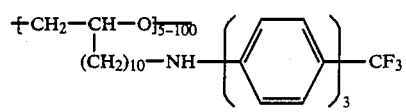

Procedures for the preparation of liquid crystalline polymers with mesogenic side chains are described in copending patent applications Ser. Nos. 822,092; 822,093; and 822,094, filed Jan. 24, 1986, respectively; incorporated herein by reference.

Nonlinear Optical Properties

The fundamental concepts of nonlinear optics and their relationship to chemical structures can be expressed in terms of dipolar approximation with respect to the polarization induced in an atom or molecule by an an external field.

As summarized in the ACS Symposium Series 233(1983) listed hereinabove in the Background Of The Invention section, the fundamental equation (1) below describes the change in dipole moment between the ground state $\mu_g$ and an excited state $\mu_e$ expressed as a power series of the electric field E which occurs upon interaction of such a field, as in the electric component of electromagnetic radiation, with a single molecule. The coefficient $\alpha$ is the familiar linear polarizability, $\beta$ and $\gamma$ are the quadratic and cubic hyperpolarizabilities, respectively. The coefficients for these hyperpolarizabilities are tensor quantities and therefore highly symmetry dependent. Odd order coefficients are nonvanishing for all structures on the molecular and unit cell level. The even order coefficients such as $\beta$ are zero for those structures having a center of inversion symmetry on the molecular and/or unit cell level.

Equation (2) is identical with (1) except that it describes a macroscopic polarization, such as that arising from an array of molecules in a liquid crystalline domain:

$$\Delta\mu = \mu_e - \mu_g = \alpha E + \beta EE + \gamma EEE + \ldots \quad (1)$$

$$P = P_0 + \chi^{(1)}E + \chi^{(2)}EE + \chi^{(3)}EEE + \ldots \quad (2)$$

Light waves passing through an array of molecules can interact with them to produce new waves. This interaction may be interpreted as resulting from a modulation in refractive index or alternatively as a nonlinearity of the polarization. Such interaction occurs most efficiently when certain phase matching conditions are met, requiring identical propagation speeds of the fundamental wave and the harmonic wave.

A present invention liquid crystalline polymer substrate typically is optically transparent and exhibits hyperpolarization tensor properties such as third harmonic generation.

These theoretical considerations are elaborated by Garito et al in chapter 1 of the ACS Symposium Series 233 (1983); and by Lipscomb et al. in J. Chem., Phys., 75, 1509 (1981), incorporated by reference. See also Lalama et al, Phys. Rev., A20, 1179 (1979); and Garito et al., Mol., Cryst. and Liq. Cryst., 106, 219 (1984); incorporated by reference.

The following examples are further illustrative of the present invention. The components and specific ingredients are presented as being typical, and various modifications can be derived in view of the foregoing disclosure within the scope of the invention.

EXAMPLE I

This Example illustrates the preparation of poly[6-(4-nitrobiphenyloxy)hexyl methacrylate] in accordance with the present invention:

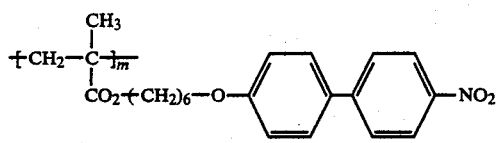

A. 4-Hydroxy-40'-nitrobiphenyl (1) 4-benzoyloxybiphenyl

To 500 ml of pyridine in a 1000 ml three necked flask is added 170 g of 4-hydroxybiphenyl. The mixture is cooled to 10° C., and 155 g of benzoyl chloride is added dropwise while keeping the mixture temperature below 20° C. After complete addition, the mixture is heated gradually to reflux and maintained at this temperature for 30 minutes. The reaction mixture is then cooled to room temperature.

The solidified product subsequently is admixed with 250 ml HCl and 250 ml water, then additional HCl and water are added and the slurry is mixed thoroughly in a blender. The particulate solid is filtered, washed with water to a neutral pH, and air-dried overnight. The crude product is recrystallized from n-butanol, mp 149°-150° C.

(2) 4-benzoyloxy-4'-nitrobiphenyl

4-Benzoyloxybiphenol (40 g) is mixed with 310 ml of glacial acetic acid and heated to 85° C. Fuming nitric acid (100 ml) is added slowly while maintaining the reaction medium temperature between 85°-90° C. After complete addition, the reaction is cooled to room temperature.

The resultant solid is filtered and washed with water and methanol. The crude product is recrystallized from glacial acetic acid, mp 211°-214° C.

(3) 4-Hydroxy-4'-nitrobiphenyl

4-Benzoxyloxy-4'-nitrobiphenyl (60 g) is mixed with 300 ml of ethanol and heated to reflux. A solution of 40 g KOH in 100 ml of water is added dropwise at reflux. After complete addition, the mixture is refluxed 30 minutes and cooled overnight. The resultant blue crystalline potassium salt is filtered and dried.

The dried salt is dissolved in a minimum amount of boiling water, and a 50/50 HCl/water solution is added until an acidic pH is obtained. The crude yellow product is filtered and washed with water until neutral, and then recrystallized from ethanol, mp 203°-204° C.

B. 4-(6-Hydroxyhexyloxy)-4'-nitrobiphenyl

To 400 ml of ethanol is added 21.5 g of 4-hydroxy-4'-nitrobiphenyl and the mixture is heated to reflux. A solution of 7.1 g of KOH in 30 ml of water is added dropwise at reflux temperature. After complete addition, a 21.7 g quantity of 6-bromohexanol is added, and the reaction medium is refluxed about 20 hours. Then the reaction medium is cooled and the ethanol is removed in a rotary evaporator.

The solid residue is slurried with water in a blender, and the particulate solid is filtered, washed with water, and air dried. The crude product is recrystallized from ethanol, mp 117°-119° C.

C. 4-(6-Methacryloxyhexyloxy)-4'-nitrobiphenyl 4-(6-Hydroxyhexyloxy)-4'-nitrobiphenyl (22 g) is dissolved in 500 ml of dry dioxane and heated to 45° C. A 14 g quantity of triethylamine is added, then a solution of 10.5 g of methacryloyl chloride in an equal volume of dioxane is added dropwise while maintaining the reaction medium temperature at 45° C.

The reaction medium is stirred at 45° C. for about 5 hours. Another 5 g of methacryloyl chloride is added and the reaction is stirred at 45° C. for about 20 hours. The dioxane then is removed under vacuum, and the solid residue is slurried in water in a blender. The particulate solid is filtered, washed with water, and air dried. The crude monomer product is recrystallized from ethanol, mp 53°-56° C.

D. Poly[6-(4-nitrobiphenyloxy)hexyl methacrylate]

The monomer (2 g) is dissolved in 20 ml of degassed benzene in a reactor, and 1 mole percent of azodiisobutyronitrile is added to the reaction medium. The reactor is heated at 60° C. for 4 days. During this period, polymer product separates from the reaction medium. After the polymerization is completed, the lower layer is slurried with methanol in a blender. The solid polymer is filtered, washed with methanol, and vacuum dried.

The polymer has a glass transition (Tg) in the range of about 35°-45° C., and forms a mesophase at about 64°-65° C.

A sample of the polymer is spread on optical glass, and heated to a temperature of 80° C. to form an isotropic melt phase. The polymer melt phase is cooled rapidly by placing the coated glass substrate on a cold surface, and the polymer solidifies in the form of a transparent glassy film. If a polymer melt phase sample is cooled slowly at a rate of 1° C. per minute, then resultant solid film is translucent and has a nematic texture.

The transparent film sample has a centrosymmetric molecular configuration, and exhibits less than 5 percent scattering of a transmitted incident light beam, while the translucent film sample exhibits more than 30 percent scattering of incident light.

When incorporated as a nonlinear optical component in a four wave mixing device, the transparent film exhibits a third order nonlinear optical susceptibility $\chi^{(3)}$ greater than about $1 \times 10^{-11}$ esu as measured at 1.91 μm excitation wavelength. The translucent film exhibits a third order nonlinear susceptibility $\chi^{(3)}$ less than $1 \times 10^{-11}$ esu under comparable conditions.

EXAMPLE II

This example illustrate the preparation of a side chain liquid crystalline polysiloxane polymer in accordance with the present invention.

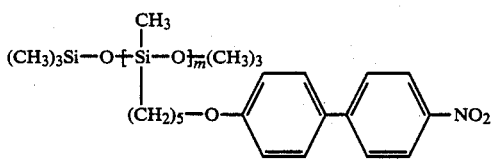

A. 4-(4-Penteneoxy)-4'-nitrobiphenyl

To 400 ml ethanol is added 21.5 g of 4-hydroxy-4'-nitrobiphenyl, and the mixture heated to reflux. A solution of 7.1 g of KOH in 30 ml of water is added dropwise at reflux temperatures. After complete addition, 18 g of 5-bromo-1-pentene is added and the reaction medium is heated at reflux temperature for about 15 hours. Ethanol is removed under vacuum from the cooled mixture, and the solid residue is slurried with water in a blender, filtered, washed with water, and air dried. The product then is recrystallized from 90/10 hexane/toluene, mp 74°–76° C.

B. Liquid crystalline polymer formation 4-(4-Penteneoxy)-4'-nitrobiphenyl and poly(methyl hydrogen siloxane) (average M.W., 500–2000) are dissolved in dry toluene, in quantities which provide a 10 mole percent excess of the biphenyl reactant. To this reaction medium is added 1–2 drops of chloroplatinic acid catalyst (5 percent weight/volume in isopropanol).

After heating at 60° C. for about 15 hours, the reaction mixture is poured into methanol to separate a precipitate of solid polymer. The solid polymer is recovered, and purified by dissolving the polymer in chloroform, and precipitating the polymer from solution with methanol.

Following the procedure of Example I, transparent optical media are prepared which have an isotropic molecular configuration with macroscopic centrosymmetry, and which exhibit less than 5 percent scattering of transmitted incident light, and exhibits third order nonlinear optical susceptibility $\chi^{(3)}$ greater than $1 \times 10^{-11}$ esu as measured at 1.91 μm excitation wavelength.

Similar optical properties are observed with the polymers prepared in accordance with procedures described in the following Examples.

EXAMPLE III

This example illustrates the preparation of a side chain liquid crystalline polyoxyalkylene polymer in accordance with the present invention.

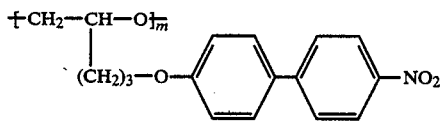

A. 4-(4,5-Epoxypentoxy)-4'-nitrobiphenyl

To 250 ml of methylene chloride is added 28.3 g of 4-(4-penteneoxy)-4'-nitrophenyl. The solution is cooled to 0° C., and 18 g of meta-chloroperbenzoic acid is added slowly. The mixture is stirred at 0° C. for 24 hours, and allowed to warm to room temperature.

The solution is filtered, and the filtrate is washed with dilute sodium carbonate, water, and dried over magnesium sulfate. The solvent is removed in a rotary evaporator at room temperature to yield the product as a solid residue.

B. Liquid Crystalline Polymer Formation 4-(4,5-Epoxypentoxy)-4'-nitrobiphenyl (2 g) is dissolved in anhydrous benzene, and heated at 40° C. for 15 hours with 1 mole percent of boron trifluoride-etherate as a catalyst.

The resultant polyoxypentylene polymer is recovered by precipitation from solution with methanol, and vacuum dried.

The polymer is purified by precipitation from a methylene chloride solution with methanol.

EXAMPLE IV

This Example illustrates the preparation of poly[4-nitrobiphenyloxyhexyloxymethylethylene terephthalate].

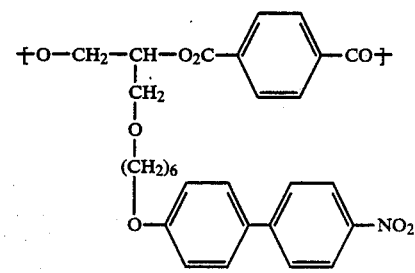

A. 4-(6-Hydroxyhexyloxy)-4'-nitrobiphenyl

To 500 ml of toluene in a one liter round bottom flask, fitted with a condenser and magnetic stirrer, are added 7.6 g (0.03M) of the potassium salt of 4-hydroxy-4'-nitrobiphenyl, 4.9 g (0.035M) of 6-iodo-1-hexanol, and 0.5 g of 18-crown-6 ether. The mixture is refluxed for about 20 hours until all of the potassium salt has dissolved and reacted as evidenced by the absence of the blue crystalline solid. The solution is filtered hot, and then cooled to room temperature. After solvent removal, the solid residue is recrystallized from ethanol to yield a purified product, m.p. 117°–119° C.

B. 2,2-Dimethyl-4-bromoethyl-1,3-dioxolane

An acetone solution of bromomethyl ethylene glycol is refluxed for 24 hours in the presence of anhydrous magnesium sulfate. The cooled reaction mixture is filtered and the solvent is removed to provide a residual crude product.

C. 2,2-Dimethyl-4-[6-(4-nitrobiphenyloxyhexyloxymethyl]-1,3-dioxolane

To a one liter round bottom flask, fitted with a condenser and magnetic stirrer, are added 10.6 1 g (0.03M) of the potassium salt of 4-(6-hydroxyhexyloxy)-4'-nitrobiphenyl, 5.85 g (0.03M) of 2,2-dimethyl-4-bromomethyl-1,3-dioxolane, and 0.5 g of 18-crown-6 ether. The reaction mixture is refluxed for 10 hours, and then filtered while hot. The solvent is removed to provide a residual crude product.

D. 4-Nitrobiphenyloxyhexyloxymethyl ethylene glycol

The crude product of procedure C is heated for 5 hours in an aqueous methanol solution containing a trace of hydrochloric acid. The reaction mixture is filtered, the solvent medium is removed, and the resultant residual solid is recrystallized from ethanol to yield a purified product.

E. Interfacial Comonomeric Condensation

A solution of 19.45 g of 4-nitrobiphenyloxyhexyloxymethyl ethylene glycol and 4 g of sodium hydroxide in 300 ml of water is charged to a high speed blender with 30 ml of 10% aqueous sodium lauryl sulfate. A solution of 10.16 g of terephthaloyl chloride in 150 ml of toluene is added to the operating blender, and stirring is continued for an additional 5 minutes. The mixture is then poured into acetone, and the polymer precipitate is filtered, washed with water, and air dried.

The polymer has a glass transition temperature (Tg) in the range of 60°–65° C.

What is claimed is:

1. A transparent nonlinear optical medium produced in accordance with a process which comprises heating a thermotropic liquid crystalline polymer above the mesophase temperature range to form an isotropic melt phase, and cooling the isotropic melt phase rapidly to below the glass transition temperature of the polymer to form a transparent solid medium; wherein the transparent nonlinear optical medium exhibits a third order nonlinear optical susceptibility $\chi^{(3)}$ of at least about $1 \times 10^{-11}$ esu as measured at 1.91 μm excitation wavelength, and wherein the polymer is characterized by a recurring monomeric unit corresponding to the formula:

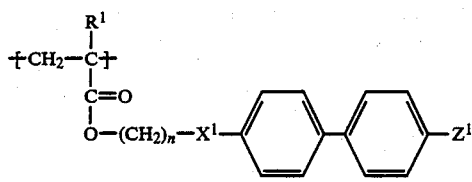

where n is an integer between about 4–20; $X^1$ is $-NR^1-$, $-O-$, or $-S-$; $R^1$ is hydrogen or methyl; $Z^1$ is $-NO_2$, $-CN$ or $-CF_3$; and where the polymer has a weight average molecular weight in the range between about 5000–200,000, and a glass transition temperature above about 40° C.; and wherein the optical medium exhibits less than about 5 percent scattering of transmitted incident light.

2. A transparent nonlinear optical medium produced in accordance with a process which comprises heating a thermotropic liquid crystalline polymer above the mesophase temperature range to form an isotropic melt phase, and cooling the isotropic melt phase rapidly to below the glass transition temperature of the polymer to form a transparent solid medium; wherein the transparent nonlinear optical medium exhibits a third order nonlinear optical susceptibility $\chi^{(3)}$ of at least about $1 \times 10^{-11}$ esu as measured at 1.91 μm excitation wavelength, and wherein the polymer is characterized by a recurring monomeric unit corresponding to the formula:

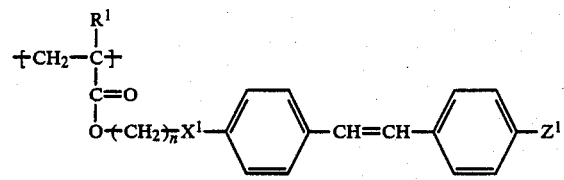

where n is an integer between about 4–20; $X^1$ is $-NR^1-$, $-O-$, or $-S-$; $R^1$ is hydrogen or methyl; $Z^1$ is $-NO_2$, $-CN$ or $-CF_3$; and where the polymer has a weight average molecular weight in the range between about 5000–200,000, and a glass transition temperature above about 40° C.; and wherein the optical medium exhibits less than about 5 percent scattering of transmitted incident light.

3. A transparent nonlinear optical medium comprising a liquid crystalline polymer which is characterized by a recurring monomeric unit corresponding to the formula:

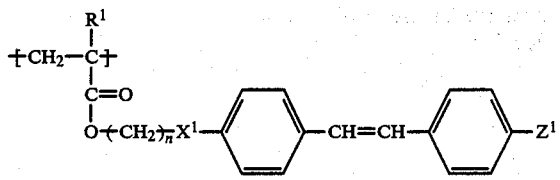

where n is an integer between about 4–20; $X^1$ is $-NR^1-$, $-O-$, or $-S-$; $R^1$ is hydrogen or methyl; $Z^1$ is $-NO_2$, $-CN$ or $-CF_3$; and where the polymer has a weight average molecular weight in the range between about 5000–200,000, and a glass transition temperature above about 40° C.; wherein the transparent nonlinear optical medium exhibits a third order nonlinear optical susceptibility $\chi^{(13)}$ of at least about $1 \times 10^{-11}$ esu as measured at 1.91 μm excitation wavelength, and the optical medium has an isotropic molecular configuration with macroscopic centrosymmetry; and wherein the optical medium exhibits less than about 5 percent scattering of transmitted incident light.

* * * * *